United States Patent [19]

Usui et al.

[11] Patent Number: 5,048,875
[45] Date of Patent: Sep. 17, 1991

[54] CONNECTOR INTERPOSED BETWEEN SMALL-DIAMETER METALLIC PIPE AND FLEXIBLE HOSE

[75] Inventors: Masayoshi Usui; Katsushi Washizu, both of Numazu City, Japan

[73] Assignee: Usui Kokusai Sangyo Daisha Limited, Japan

[21] Appl. No.: 464,306

[22] Filed: Jan. 12, 1990

[30] Foreign Application Priority Data

Jan. 18, 1989 [JP] Japan .................. 1-4098[U]

[51] Int. Cl.$^5$ .............................. F16L 39/00
[52] U.S. Cl. ................... 285/319; 285/330; 285/351; 285/921
[58] Field of Search ............ 285/319, 921, 351, 330

[56] References Cited

U.S. PATENT DOCUMENTS

| 2,892,991 | 6/1959 | Beebee et al. |
| 3,169,030 | 2/1965 | Lippincott |
| 3,453,005 | 7/1969 | Foults |
| 3,826,523 | 7/1974 | Eschbaugh |
| 3,933,378 | 1/1976 | Sandford et al. |
| 4,026,581 | 5/1977 | Pasbrig |
| 4,035,005 | 7/1977 | De Vincent et al. |
| 4,074,912 | 2/1978 | Van Bilderbeek et al. |
| 4,219,222 | 8/1980 | Brusadin |
| 4,275,907 | 6/1981 | Hunt |
| 4,451,069 | 5/1984 | Melone |
| 4,601,497 | 7/1986 | Bartholomew |
| 4,637,636 | 1/1987 | Guest |
| 4,637,640 | 1/1987 | Fournier et al. |
| 4,673,199 | 6/1987 | Renfrew |
| 4,673,200 | 6/1987 | Miyauchi ............ 285/921 X |
| 4,681,351 | 7/1987 | Bartholomew |
| 4,682,798 | 7/1987 | Sauer ............ 285/921 X |
| 4,730,856 | 3/1988 | Washizu |
| 4,743,051 | 5/1988 | Proni ............ 285/921 X |
| 4,749,214 | 6/1988 | Hoskins et al. |
| 4,753,458 | 6/1988 | Case et al. |
| 4,756,558 | 7/1988 | Beamer ............ 285/921 X |
| 4,776,616 | 10/1988 | Umehara et al. |
| 4,778,203 | 10/1988 | Bartholomew |
| 4,781,400 | 11/1988 | Cunningham |
| 4,793,637 | 12/1988 | Laipply et al. |
| 4,895,396 | 1/1990 | Washizu ............ 285/319 X |

FOREIGN PATENT DOCUMENTS 593413 5/1959 Italy .
855603 12/1960 United Kingdom .

Primary Examiner—Dave W. Arola
Attorney, Agent, or Firm—Anthony J. Casella; Gerald E. Hespos

[57] ABSTRACT

A connector interposed between a small-diameter metallic pipe with a collar end wall and a flexible hose to connect them comprises a joint and a retainer. The joint is formed with a through hole extending in the axial direction thereof, and has a protrusion wall and two cylindrical walls projecting therefrom on either side. One cylindrical wall has a sealing member fitted in an annular groove formed in the periphery thereof. The retainer has an engaging wall formed with an opening adapted to be engaged with the one cylindrical wall, and a plurality of elastic arm walls with click walls extending from the engaging wall in the axial direction. In use, the one cylindrical wall is inserted in the metallic pipe, the other cylindrical wall is inserted in the flexible hose, and the collar end wall and the protrusion wall are resiliently clamped between the engaging wall and the click walls.

17 Claims, 4 Drawing Sheets

CONNECTOR INTERPOSED BETWEEN SMALL-DIAMETER METALLIC PIPE AND FLEXIBLE HOSE

BACKGROUND OF THE INVENTION

1. Field of the Invention

This invention relates to a connector interposed between a small-diameter metallic pipe (of no larger than 20 mm diameter) provided in various machines such as cars as a supply path of oil, air, etc. and a flexible hose, such as a resin tube or rubber hose, and more particularly, to an improvement of a quick connect/ disconnect type connector.

2. Description of the Prior Art

A conventional connector is configured as shown in FIG. 12. A joint 11 has a through hole 12 formed therein extending in the axial direction, whose one half has a bearing surface at the end and threads 13 on the periphery thereof, and whose other half has a cylindrical wall 15. To connect a metallic pine p' and a flexible hose H', a flare end wall $P_1'$ of the metallic pipe P' is brought into contact with the bearing surface and a locknut 14 is screwed, and on the other hand, the flexible hose H' is fitted on the cylindrical wall 15 and a ring member 16 is attached by caulking or the like.

Therefore, when attaching such a conventional connector, the work of connection is troublesome because the locknut 14 must be screwed on one side, it is difficult in an assembly line to make the tightening force on the side of the metallic pipe P' certain, this sometimes causing leakage, the work of connection/ disconnection for the joint 11 and the metallic pipe P' is difficult to perform, particularly in a narrow space, and requires a long work time because it requires the work of screwing and a tool such as a spanner.

SUMMARY OF THE INVENTION

In view of the foregoing defects of the prior art, it is an object of the present invention to provide a connector interposed between a metallic pipe and a flexible hose, which makes the work of connection quick and easy, simplifying such a work; makes the clamping force at a connected point substantially certain, avoiding a fear of leakage; requires no tool in the work of connection, facilitating such a work even in a narrow space and thus in an assembly line; and allows the repeated use of it at a disconnected point without difficulty.

To accomplish the foregoing object, the present invention provides a connector interposed between a small-diameter metallic pipe and a flexible hose, which comprises a joint formed with a through hole extending in the axial direction thereof, and having a protrusion wall and two cylindrical walls projecting therefrom on either side, one of the cylindrical walls having a sealing member fitted in an annular groove formed in the periphery thereof; and a retainer having an engaging wall formed with an opening adapted to be engaged with the one cylindrical wall, and a plurality of elastic arm walls with click walls extending from the engaging wall. In using the foregoing connector, the engaging wall of the retainer is brought into contact with a collar end wall of the metallic pipe, the one cylindrical wall is inserted in the metallic pipe such that the sealing member is pressed by the inner surface of the metallic pipe, the click walls of the elastic arm walls are resiliently clamped by the protrusion wall of the joint, and the flexible hose is fitted on the other cylindrical wall.

The metallic pipe may have an enlarged wall contiguous to the collar end wall, each elastic arm wall may have a snap wall projecting axially outward from its click wall, and each arm wall may also have a clamp pawl projecting axially inward therefrom which is adapted to be clamped by the collar end wall. The retainer is made of a metallic spring, or resin, or rubber.

According to the present invention, and because of the foregoing structure, the sealing member is pressed by the inner surface of the metallic pipe in which the joint is inserted, the end of the metallic pipe is resiliently clamped by the retainer, and the retainer is clamped by the protrusion wall after its elastic arm walls are opened and closed. Therefore, the work of connection can be completed readily, quickly and reliably, simplifying such a work; the clamping force at a connected point can be made substantially certain, avoiding a fear of leakage; no tool is required in the work of connection, facilitating such a work even in a narrow space and thus in an assembly line; and the repeated use of the connector at a disconnected point is allowed without difficulty.

DETAILED DESCRIPTION OF THE PREFERRED EMBODIMENTS

Figure 1:
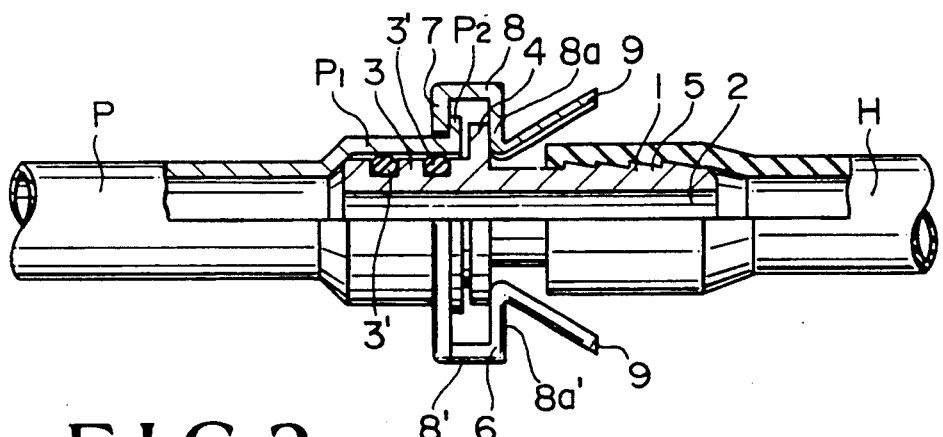
FIG. 1 is a sectional view of an embodiment of a connector interposed between a small-diameter metallic pipe and a flexible hose according to the present invention.

In the drawings, the same or similar components are designated by the same reference numeral.

Figure 2:
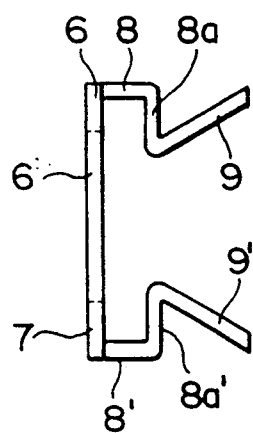
FIG. 2 is a side view of a retainer shown in FIG. 1.
Figure 3:
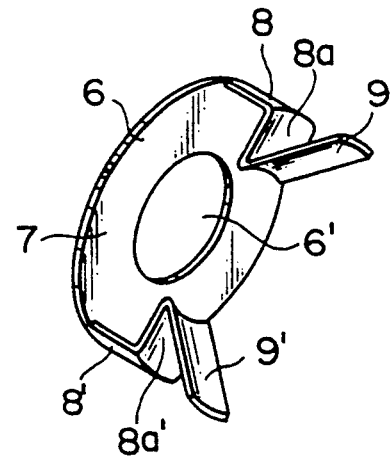
FIG. 3 is a perspective view of the retainer shown in FIG. 2.

In FIGS. 1, 2 and 3, 1 is a joint made of metal which is formed with a through hole 2 extending in the axial direction thereof, and has two cylindrical walls 3 and 5 projecting on either side and an annular protrusion wall 4 arranged between the cylindrical walls 3 and 5, the one cylindrical wall 3 having annular grooves formed in the periphery thereof in which sealing members 3' are fitted. 6 is a retainer made of a metallic spring, or resin, or rubber and formed with an opening 6' adapted to be engaged with the one cylindrical wall 3 of the joint 1, which has an engaging wall 7 around the opening 6' and a plurality of elastic arm walls 8, 8' (only one pair is included in the embodiment) extending axially from the engaging wall 7 to assume an L-shape. The arm walls 8, 8' are bent radially to define click walls 8a, 8a'. 9, 9' are snap walls extending from the click walls 8, 8' of the elastic arm walls 8a, 8a', which are controlled by a finger pressure to open the elastic arm walls 8, 8', or serve as guides, that is, when the joint 1 is inserted in a metallic pipe P, these snap walls are pushed and opened by the protrusion wall 4 of the joint 1. The metallic pipe P has an enlarged wall $P_1$ (see FIG. 1) and a collar end wall $P_2$ contiguous thereto. To connect the metallic pipe P and the joint 1, the metallic pipe P is fitted on the joint 1 such that the inner surface of the enlarged wall $P_1$ presses the sealing members 3', and the click walls 8a, 8a' of the elastic arm walls 8, 8' are resiliently clamped by the protrusion wall 4 of the joint 1, with the result that the engaging wall 7 of the retainer 6 is held in contact with the collar end wall $p_2$. H is a flexible hose, such as a resin tube or rubber hose, which is fitted on the other cylindrical wall 5.

Figure 4:
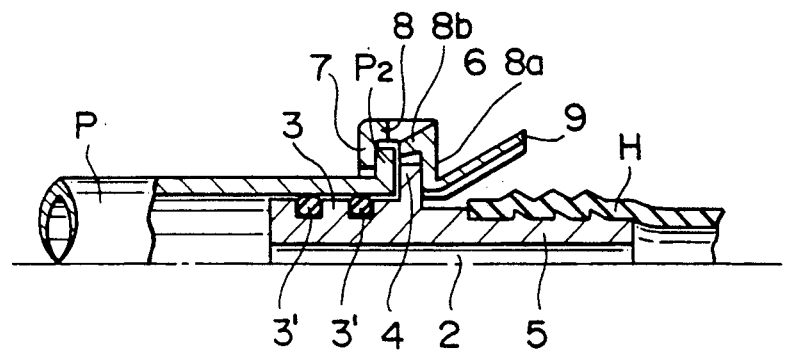
FIG. 4 is a sectional view of another embodiment.

The metallic pipe P may not be provided with the enlarged wall $P_1$ as shown in FIG. 4. However, by providing the enlarged wall $P_1$, it is possible to make the inner diameter of the through hole 2 of the joint 1 close to the inner diameter of the metallic pipe P, thereby decreasing a flow passage resistance.

Further, to facilitate attaching and detaching of the retainer 6 and increase its clamping force, a clamp pawl 8b extending axially inward may be provided integrally on the elastic arm wall 8, 8' as shown in FIG. 4, whose point is adapted to be clamped by the collar end wall $P_2$.

Figure 5A:
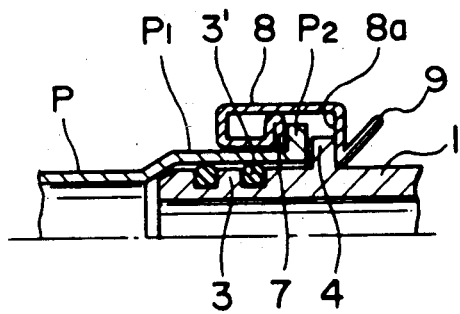
FIGS. 5(a) and 5(b) are a fragmentary sectional view of a further embodiment and a fragmentary perspective view of the retainer thereof, respectively.
Figure 5B:
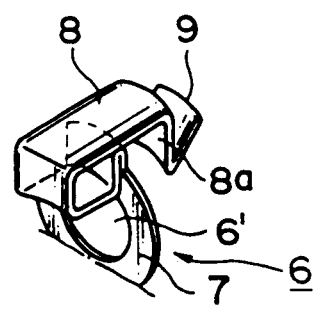
Figure 6A:
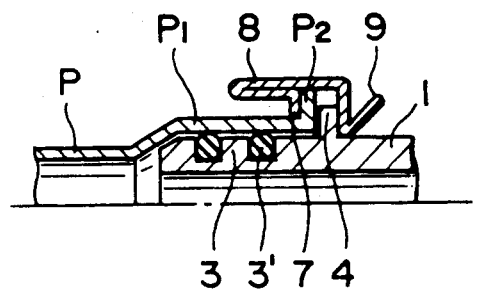
FIGS. 6(a) and 6(b) are a fragmentary sectional view of a further enbodiment and a fragmentary perspective view of the retainer thereof, respectively.
Figure 6B:
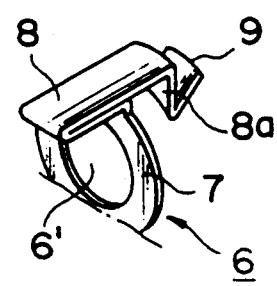

FIGS. 5 and 6 show further embodiments which are characterized in that to facilitate attaching and detaching of the retainer 6 to and from the joint 1, the point about which the elastic arm wall 8, 8' is opened is shifted toward the metallic pipe P and the longitudinal length of the elastic arm wall 8, 8' is increased. Specifically, the elastic arm wall of the embodiment shown in FIG. 5 that extends from the engaging wall 7 is bent to assume a substantial C-shape, whereas that of FIG. 6 assumes a substantial U-shape.

Figure 7:
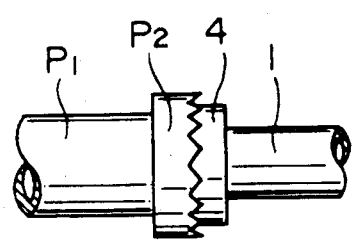
FIG. 7 is a fragmentary plan view of a further embodiment with no retainer illustrated.
Figure 8:
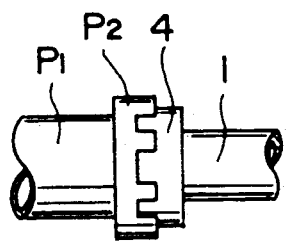
FIG. 8 is a fragmentary plan view of a further embodiment with no retainer illustrated.

Further, where it is desired to prevent relative rotation between the metallic pipe P and the joint 1, the opposing surfaces of the collar end wall $P_2$ of the metallic pipe P and the protrusion wall 4 of the joint 1 may be changed to sawtooth-like surfaces for mutual engagement as shown in FIG. 7, or may be formed with radial grooves and protrusions for mutual engagement as shown in FIG. 8.

Figure 9A:
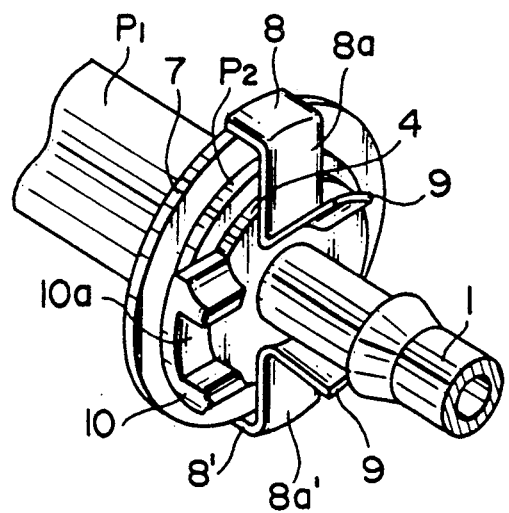
FIGS. 9(a) and 9(b) are perspective views of a further embodiment in different positions.
Figure 9B:
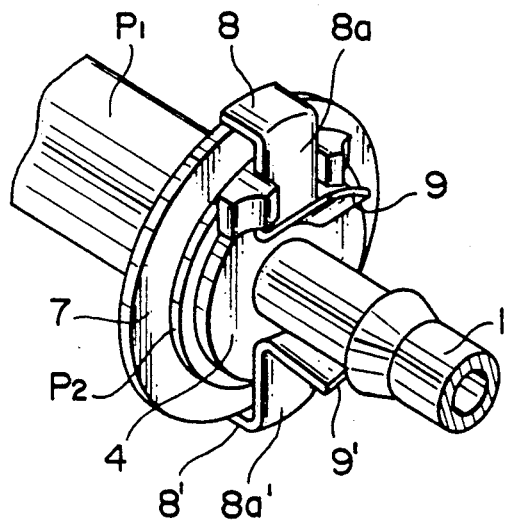
Figure 10:
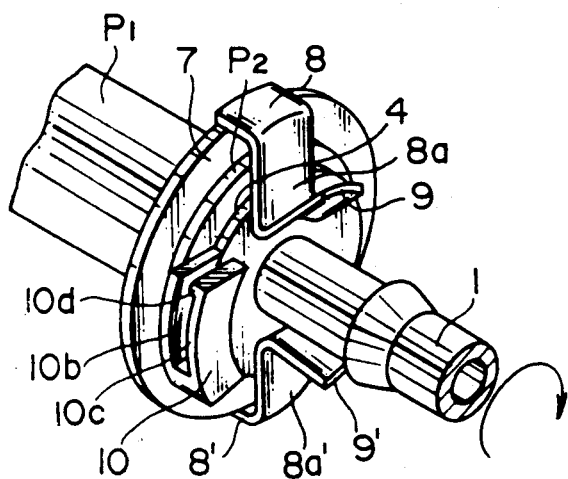
FIG. 10 is a fragmentary perspective view of a further embodiment.
Figure 11A:
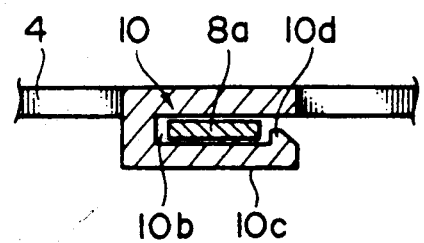
FIGS. 11(a) and 11(b) are fragmentary sectional views corresponding to FIG. 10.
Figure 11B:
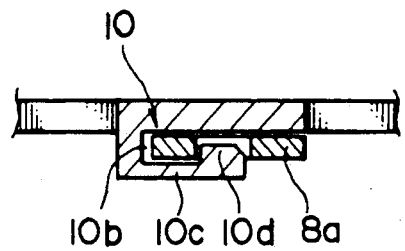
Figure 12:
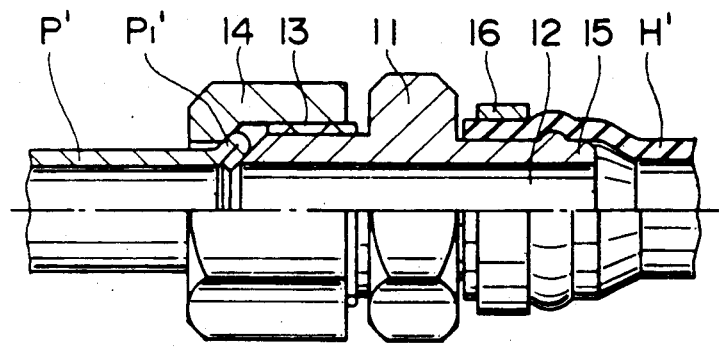
FIG. 12 is a sectional view of a conventional connector.

Further, where it is desired to prevent relative rotation between the retainer 6 and the joint 1, the protrusion wall 4 of the joint 1 may be formed or provided with a pair of engaging block members 10 as shown in FIGS. 9(a) and 9(b) (only one block member is illustrated for clarification) each having a groove 10a. The groove 10a has a width substantially identical with the width of the click wall 8a, 8a' of the retainer 6, and is adapted, upon rotation of the joint 1 or the retainer 6, to be engaged with the click wall 8a, 8a', thereby preventing relative rotation of them as shown in FIG. 9(b). Instead of configuring the engaging block member 10 as shown in FIGS. 9(a) and 9(b), the engaging block member may be formed as having a U-shape which is open in the circumferential direction as shown in FIG. 10. That is, the engaging block member 10 of FIG. 10 has a grip wall 10c and a protrusion portion 10d with leaving a groove 10b thereinside. Upon rotation of the joint 1 or the retainer 6, the click wall 8a, 8a' is received in the groove 10b as shown in FIG. 11(a), so that the click wall is kept in place by the protrusion portion 10d. Where it is desired to make the retention of the click wall 8a, 8a' more reliable, a hole 8b may be formed in a central portion of the click wall as shown in FIG. 11(b). In this case, the protrusion portion 10d is received in this hole 8b upon rotation.

Further, where it is desired to prevent relative rotation among the metallic pipe P, joint 1, and retainer 6, this can be accomplished by selectively combining the embodiments of FIGS. 7 through 11(b).

As described above, in the connector adapted to be interposed between a small-diameter metallic pipe and a flexible hose according to the present invention, the end of the metallic pipe P is brought into contact with the engaging wall 7 of the retainer 6, the joint 1 is inserted in the metallic pipe P such that the metallic pipe P presses the sealing members 3' provided on the periphery of the joint 1, and the click walls 8a, 8a' of the elastic arm walls 8, 8' are resiliently clamped by the protrusion wall 4 of the joint 1, that is, the retainer 6 is kept in place by the opening and closing of the elastic arm walls 8, 8' caused by the protrusion wall 4. Therefore, the work of connection can be completed readily, quickly and reliably, simplifying such a work; the clamping force at a connected point can be made substantially certain, avoiding a fear of leakage; no tool is required in the work of connection, facilitating such a work even in a narrow space and thus in an assembly line; the repeated use of the connector at a disconnected point is allowed without difficulty; and the relative rotation of the metallic pipe, retainer and joint can be prevented.

What is claimed is:

1. A connector for connecting a small-diameter metallic pipe having a substantially constant wall thickness and a flexible hose, the pipe having a terminal end defining an outwardly extending collar end wall, said connector comprising:

a joint having opposed first and second axial ends and being formed with a through hole extending in the axial direction of the joint from the first end to the second end thereof, a protrusion wall projecting outwardly on the joint from a location intermediate the first and second axial ends, and first and second cylindrical walls projecting axially from the protrusion wall toward the respective first and second ends, the first of said cylindrical walls having a sealing member fitted in an annular groove formed in the outer periphery thereof and being dimensioned to be fit in the end of the pipe, the second cylindrical wall being engageable with the hose, and a retainer having an engagin wall formed with an opening larger than the diameters of both the first cylindrical wall and portions of the pipe adjacent the end thereof, but smaller than the collar end wall of the pipe, such that the engaging wall can be slidably disposed on the end of the pipe in engagement with and disengagement from the collar end wall thereof, and a plurality of elastic arm walls extending from said engaging wall in the axial direction of the connector, the elastic arm walls being spaced from one another to permit disposition of both the collar end wall of the pipe and the protrusion wall of the joint therebetween, each of said elastic arm walls having a click wall extending therefrom radially inwardly to define a cross section smaller than the cross section defined by the protrusion wall of the joint, whereby the engaging wall and the click walls of the retainer are engageable respectively with the collar end wall of the pipe and the protrusion wall of the joint for retaining the first cylindrical wall of the joint in the end of the pipe.

2. A connector according to claim 1, wherein the metallic pipe has an enlarged wall contiguous to the collar end wall.

3. A connector according to claim 1, wherein each of said elastic arm walls extending from said engaging wall has a substantial L-shape.

4. A connector according to claim 1, wherein each of said click walls has a snap wall projecting therefrom axially outward, which is adapted to be controlled by a finger pressure.

5. A connector according to claim 1, wherein each of said elastic arm walls has a clamp pawl projecting therefrom axially inward, which is adapted to be clamped by the collar end wall of the metallic pipe.

6. A connector according to claim 1, wherein said retainer is made of a metallic spring.

7. A connector according to claim 1, wherein the opposing surfaces of the collar end wall of the metallic pipe and said protrusion wall of said joint are formed with protrusions and grooves for mutual engagement.

8. A connector according to claim 1, wherein said retainer and said joint have means for preventing their relative rotation.

9. A connector according to claim 8, wherein said preventing means are engaging block members provided on the periphery of said protrusion wall, which are adapted to be engaged with said click walls of said retainer.

10. A connector according to claim 1, wherein said retainer is made of resin.

11. A connector according to claim 1, wherein said retainer is made of rubber.

12. A connector according to claim 1, wherein each said elastic arm wall includes a first portion extending in a first axial direction from the engaging wall of the retainer and a second portion extending from the first portion in a second axial direction across the engaging wall such that the click wall is engageable with the protrusion wall of the joint, the first portion of each elastic arm wall enabling easier deflection of both the second portion thereof and the click wall for facilitating connection of the joint to the pipe.

13. A connector according to claim 12, wherein the first and second portions of the elastic arm walls are disposed to define a substantial C-shape.

14. A connector comprising:
a small-diameter metallic pipe having a substantially constant wall thickness and having an end characterized by a collar end wall extending outwardly therefrom and defining an outer diameter, a cylindrical wall adjacent the collar end wall of the pipe and defining an outer diameter smaller than the outer diameter of the collar end wall;

a joint having opposed first and second axial ends and being formed with a through hole extending in the axial direction from the first end to the second end thereof, a protrusion wall projecting outwardly on the joint from a location intermediate the first and second axial ends, and first and second cylindrical walls projecting axially from the protrusion wall toward the respective first and second ends of the joint, the first cylindrical wall having a sealing member fitted on an outer peripheral surface thereof and being sealingly engaged in the end of the pipe, such that the protrusion wall of the joint is disposed outwardly from the pipe and substantially adjacent the collar end wall thereof, the second cylindrical wall of the joint being engageable with a hose; and a retainer having an engaging wall with an opening formed therein larger than the diameter of the cylindrical portion of the pipe but smaller than the collar end of the pipe, the cylindrical portion of the pipe extending through the opening in the engaging wall of the retainer and the collar end wall of the pipe being in face-to-face engagement with the engaging wall of the retainer, a plurality of elastic arm walls extending from the engaging wall of the retainer in the axial direction of the joint such that at least portions of the elastic arm walls are disposed radially outwardly from both the collar end wall of the pipe and the protrusion wall of the joint, a click wall extending radially inwardly from each said elastic arm wall and engaging a side of the protrusion wall of the joint opposite the collar end wall of the pipe for holding the joint in sealed engagement with the end of the pipe.

15. A connector as in claim 14 wherein the retainer further comprises a snap wall extending from a radially inner portion of each said click wall and projecting angularly outwardly and away from the engaging wall of the retainer, the snap wall being engageable by the protrusion wall of the joint for generating outward deflection of the elastic arm walls during insertion of the first cylindrical wall of the joint into the end of the pipe.

16. A connector as in claim 15 wherein each said elastic arm wall includes a first portion extending away from the collar end wall of the pipe and a second portion extending from the first portion beyond the engaging wall of the retainer and over the collar end wall of the pipe and the protrusion wall of the joint, whereby the first portion of each elastic arm wall defines an axial length selected to facilitate deflection of the elastic arm wall and the click wall extending therefrom.

17. A connector as in claim 15 wherein the protrusion wall of the joint comprises at least one block member formed on a side thereof facing the second end of the joint, the block member being engageable with one said click wall for preventing rotation of the retainer relative to the joint.

* * * * *